United States Patent
Tanaka

[11] 3,950,074
[45] Apr. 13, 1976

[54] IMAGE-TRANSMITTING LIGHT-CONDUCTING FIBRE ARRAY

[75] Inventor: Atsuyuki Tanaka, Sakai, Japan

[73] Assignee: Minolta Camera Kabushiki Kaisha, Osaka, Japan

[22] Filed: Oct. 8, 1974

[21] Appl. No.: 513,163

[30] Foreign Application Priority Data
Nov. 7, 1973  Japan.............................. 48-128720

[52] U.S. Cl.............................................. 350/96 B
[51] Int. Cl.²................................................ G02B 5/14
[58] Field of Search.... 350/188, 96 R, 96 B, 96 BC, 350/96 GN; 250/227

[56] References Cited
UNITED STATES PATENTS 3,421,097  1/1969  Koester et al........................ 350/188
3,658,407  4/1972  Kitano et al. .................. 350/96 GN

*Primary Examiner*—Davis L. Willis
*Attorney, Agent, or Firm*—Wenderoth, Lind & Ponack

[57] ABSTRACT

An image-transmitting light-conducting fibre array made up of fibres each of which is a rod-like member which is made of a transparent material, is drawn to a required diameter, and is subjected to a process to impart thereto an outer periphery comprising a multiplicity of indented portions and protuberant portions, and a coating of light-adsorbent material, which is retained in and fills said indented portions of said outer periphery of said rod-like member.

2 Claims, 10 Drawing Figures

U.S. Patent  April 13, 1976  3,950,074
FIG. 1 (PRIOR ART)
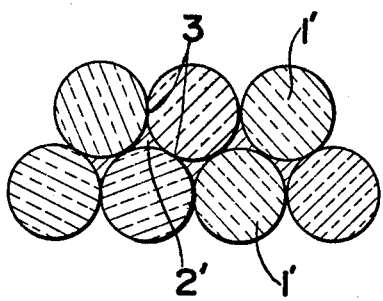
FIG. 5
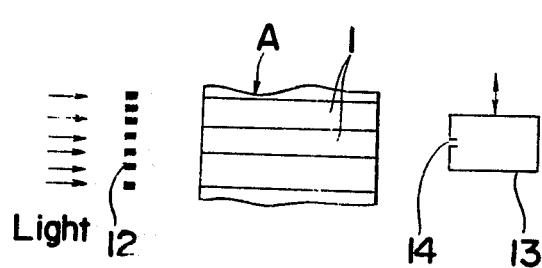
FIG. 2a
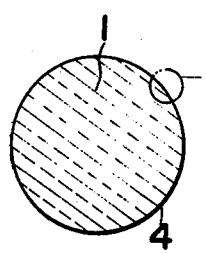
FIG. 2b
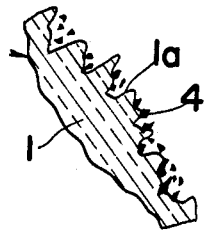
FIG. 3
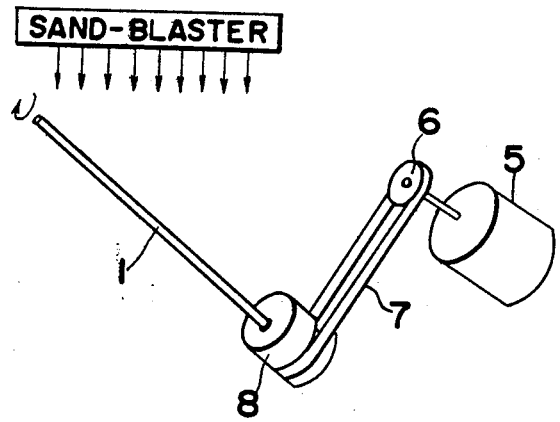
FIG. 4a  FIG. 4b  FIG. 4c
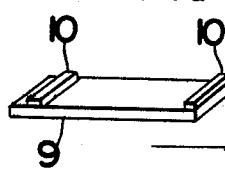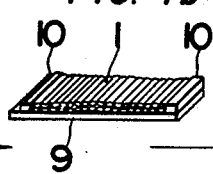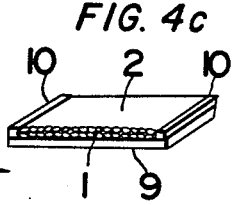
FIG. 4d  FIG. 4e
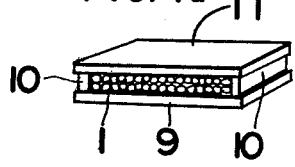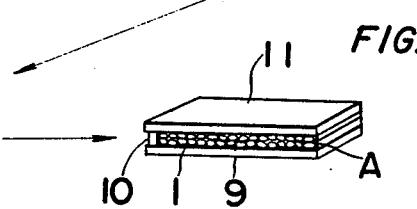

IMAGE-TRANSMITTING LIGHT-CONDUCTING FIBRE ARRAY

The present invention relates to an array of image-transmitting light-conducting fibres made of glass or similar material, and more particularly to an image transmitting light-conducting fibre array suitable for use in a photocopying machine.

There are many known types of commercially available photocopying machines, which, although functioning in a generally satisfactory manner, have a disadvantage that they are bulky, and it has accordingly become a recent object of manufacturers to provide a more compact machine. There having been developed various methods for achieving this object.

For example, one typical relatively small-sized copying machine heretofore developed employs for its optical system an array of image-transmitting light-conducting fibres such as that produced under the trade name of SELFOC (a trademark registered in Japan and owned by Nippon Sheet Glass Co., Ltd.).

The SELFOC fibres are image-transmitting light-conducting fibres made of glass or synthetic resin and having a refractory index distribution in a cross section thereof that varies consectively and parabolically outwards from a center portion thereof, said refractive index distribution satisfying the following equation: $n = N(1-ar^2)$ wherein $N$ is the refractive index at the center, $n$ is the refractive index at a distance $r$ from the center, and $a$ is a positive constant. The SELFOC fibres and the image transmitter formed by a bundle of SELFOC fibres are described in the U.S. Pat. No. 3,658,407 patented on Apr. 25, 1972 and reference may be made thereto for the details thereof.

Such an array, which is shown in cross-section in FIG. 1, comprises a plurality of image-transmitting light-conducting fibres 1', which are arranged in a side by side relationship and parallel with one another, in a bundled configuration, the fibres 1' being maintained in this configuration by a bonding material 2'. In such an array, light which enters a fibre 1' at an angle less than the aperture angle of the fibre 1' will be transmitted completely through the fibre 1', but light entering the fibre 1' at an angle greater than the aperture angle thereof will impinge on the interfacial surface 3 between the fibre 1' and bonding material 2' at an angle beyond the critical angle of reflection of the interfacial surface 3, and will pass into the bonding material 2'. The bonding material 2' provides some adsorption of such light which fails to be reflected at an interfacial surface 3, but if the array as a whole is to be kept compact, the fibres 1' must be close to one another, and the bonding material 2' is therefore very thin, and fails to adsorb all of this light, which is scattered or refracted from one fibre 1' into neighbouring fibres 1', and produces a background of stray light in these neighbouring fibres 1'. When said image-transmitting light-conducting fibre array is used to transfer image-forming light, this background of stray light can have the effect of washing out image-transferring light being transmitted along the fibres 1' and result in reproduction of an unsatisfactory image in which there is a general effect of flare, and very poor contrast.

It has been attempted, in an effort to meet this problem, to coat on each fibre a light adsorbent film to a certain thickness. But this method has the disadvantage that it is difficult to ensure even thickness of the light adsorbent film, and thus an even diameter of fibres, with the result that it is difficult to assemble fibres in a good parallel relationship to one another, which is necessary if the fibres are to serve as an image-transferring array.

It is accordingly an object of the present invention to provide an image-transmitting light-conducting fibre array wherein background of stray light is effectively reduced, whereby images of improved contrast are obtained.

It is a further object of the invention to provide an image-transmitting light-conducting fibre array wherein fibres are provided with a light-adsorbent coating but are even in diameter.

It is a still further object of the invention to provide an image-transmitting light-conducting fibre array which permits production of images having improved contrast and which is simple and low-cost in construction.

In accomplishing these and other objects, there is provided, according to the present invention, an array comprising a number of image-transmitting light-conducting fibres, which are arranged parallel to one another in a bundled configuration, and which are produced by glass or other suitable material which is drawn into a rod having a suitable length and diameter, are then subjected to an abrasive process effected evenly over the entire outer periphery thereof to impart a rough surface thereto, while maintaining the greatest diameter of each of them equal to each other, and are then dipped into a fluid solution of light-adsorbent material which is retained in the depressions of the outer periphery of the fibre and subsequently hardens to provide a light-adsorbent coating.

A better understanding of the present invention may be had from the following full description, when read with reference to the attached drawings, in which like numerals refer to like parts, and in which:

FIG. 1 is a cross-sectional view of the prior art image-transmitting light-conducting fibre array, reference to which has been already made in the foregoing description;

FIG. 2a is an enlarged cross-sectional view of a image-transmitting light-conducting fibre employable in an image-transmitting array according to the invention;

FIG. 2b is a greatly enlarged cross-section showing the structure of the periphery of the fibre of FIG. 2a;

FIG. 3 is a perspective view showing the set-up for an abrashion process for the fibre of FIG. 2;

FIGS. 4a through 4e show stages in the assembly of a plurality of the fibres of FIG. 2 to form an array; and FIG. 5 is a schematic illustration of a test setup for testing the array of FIG. 4.

Referring to FIGS. 2 and 3, according to the present invention there is initially prepared a plurality of image-transmitting light-conducting fibres 1, each of which is constituted by glass or other suitable material drawn in a conventionally known manner to produce a fibre of required length and having a uniform cross-section. This fibre 1 is treated to give it a rough outer periphery as shown in FIG. 2(b) as follows. As shown in FIG. 3, each fibre 1 is mounted with a small portion of one end thereof, which is subsequently discarded, fixedly held in a rotatable holder 8, the manner of mounting the fibre 1 being such that the longitudinal axis thereof coincides with the rotational axis of the holder 8, and the holder 8 holding the fibre 1 inclined at an acute angle to the horizontal. The drive force to rotate the holder 8, and hence the fibre 1, is supplied from a motor 5 acting through a drive pulley 6, which is fixedly mounted on the output shaft of the motor 5, and a transmission belt 7, which passes around both the drive pulley 6 and the holder 8. The fibre 1 is rotated at a speed of 60 rpm. for 30 minutes, while being subjected to a blast of sand of about 500 mesh in size directed vertically downwards thereonto, thereby imparting to the entire outer periphery of the fibre 1 a rough surface 1a, as shown in the greatly enlarged section of FIG. 2b. It is to be noted that, in practice, the size of sand employed for blasting may be whithin the range of about 1000 mesh to 400 mesh, and more preferably, of 800 mesh to 400 mesh, to obtain a sufficient effect to produce a suitable rough surface on the fibre in the above mentioned honing working. When employing coarse sand of a size larger than 400 mesh, the outer surface of fibre turns to a form like frosted glass which prevents it from being coated with the light-adsorbent material, as described later, and, in turn, when employing fine sand of a size smaller than 1000 mesh, the outer surface of fibre does not change to a form suitable to be coated with the light-adsorbent material. After this treatment the fibre 1 is removed from the holder 8, and then dipped into a coating solution of a light-adsorbent material such as India ink, and is subsequently slowly withdrawn therefrom. During withdrawal of the fibre 1 from the coating solution, the solution is retained in the indented portions of the outer peripheral surface of the fibre, the deeper the indentation of a particular portion of the fibre outer periphery, the greater the amount of accumulated solution. This adhering solution is then allowed, or caused to dry and harden and so form a light adsorbent film 4 around the fibre 1, which retains a substantially even cross-section, since the variations of depth of indentation of different portions of the outer periphery thereof are matched by variations of thickness of different portions of the film 4, as indicated also in FIG. 2b. The prepared fibre 1 is thus a fibre having a substantially even cross-section and constituted by a central core, which represents by far the greatest portion of the fibre, and serves to direct light along the longitudinal axis thereof, and by a thin coating film 4, which serves to adsorb light directed into the fibre at an angle greater than the aperture angle thereof.

Referring now to FIG. 4, fibres 1 prepared in the abovedescribed manner, and each having a uniform diameter and comprising a light-adsorbent coating film 4, are assembled to form an image-transmitting array A as follows. There is provided a generally rectangular base board 9, at or near the opposite short sides of which there are provided, in fixed or integral attachment, side blocks 10 extending upwards from the upper surface thereof (FIG. 4a). Into the space defined by the side blocks 10 and the upper surface of the base board 9 there are laid a plurality of fibres 1 in side by side relationship and parallel to one another (FIG. 4b). A bonding material 2, for example epoxy resin or other suitable material, in a fluid state is then poured onto the assembled fibres 1, and subsequently allowed to harden in order to hold the fibres 1 in position (FIG. 4c). Next, the assembly is covered with a top board 11, which has the same general dimensions as the base board 9, and is positioned parallel thereto, the lower side of the opposite short sides of the top board 11 being affixed to the tops of the side blocks 10 (FIG. 4d). If required, the top board 11 may, of course, be placed in position before the bonding material 2 hardens. Finally, as indicated in FIG. 4e, the opposite ends of the fibres 1 are trimmed off to provide a complete array A with the required optical characteristics ready for mounting in the desired equipment.

Referring now to FIG. 5, an array A constituted by plurality of individual image-transmitting light-conducting fibres 1 prepared in the manner described above was tested as follows. The array A was positioned between a chart 12 carrying a 2 line pairs/mm test pattern, and a photoelectric cell 13, which could receive light via a slit 14, which was $1.5\mu$ wide, and corresponded, in effect, to an image-forming surface onto which light was directable by the array A. The chart 12 was illuninated from the opposite side thereof to the array A, i.e., from the left in the drawing, and the photoelectric cell was caused to scan the chart 12 upwards and downwards by means of a known conveyor (not shown) or the like, via the array A. The current flowing in the photoelectric cell 13 was measured during this scanning and it was found that, as tabulated in Table I, maximum photocurrent Imax was 37pA, whereas minimum photocurrent (i.e., current representing flare) Imin was 4pA. In other words, calculating contrast as Imax − Imin / Imax + Imin, the array A permits a high contrast of 0.8.

Table I

| subject | result | photocurrent | | contrast |
|---|---|---|---|---|
| | | Imax | Imin | Imax−Imin / Imax+Imin |
| array of the present invention | | 37 | 4 | 0.8 |
| conventional array | | 60 | 15 | 0.6 |

This is a considerable improvement on the value of 0.6 obtainable with a conventional array of image-transmitting light-conducting fibres which was tested under the same conditions, results in this case also being shown in Table I, from which it may be seen that Imin with the means of the invention is less than one third that in a conventional means.

As is clear from the above description, the present invention provides an image-transmitting light-conducting fibre array which provides improved contrast of images, but is simple and inexpensive in preparation and assembly.

What is claimed is:

1. An array of image-transmitting light-conducting fibres each of which is a cylindrical member of a single light-conducting material and having an outer peripheral surface with a multiplicity of alternate indented portions and protuberent portions, and each being coated with a light-adsorbent material which fills said indented portions to a depth sufficient to bring the outer surface thereof generally level with the outermost surface of said protuberent portions and giving to the fibre a substantially uniform outside diameter said fibres being bound together in parallel side by side relationship with one another, and corresponding opposite ends thereof being coplanar and constituting an image emitting face and an image receiving face, whereby light entering said fibre at an angle greater than an aperture angle thereof is adsorbed by said light-adsorbent material so that the effect of flair is prevented in the transmission of images.

2. An array for the transmission of images as recited in claim 1, wherein said fibres are bound together by epoxy resin.

* * * * *